United States Patent
An et al.

(10) Patent No.: US 11,548,514 B2
(45) Date of Patent: Jan. 10, 2023

(54) APPARATUS AND METHOD FOR DETECTING ATTENTION LEVEL OF DRIVER

(71) Applicants: HYUNDAI MOTOR COMPANY, Seoul (KR); KIA CORPORATION, Seoul (KR)

(72) Inventors: Dae Yun An, Anyang-si (KR); Gyun Ha Kim, Incheon (KR); Eung Hwan Kim, Seoul (KR); Sang Kyung Seo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 40 days.

(21) Appl. No.: 17/375,668

(22) Filed: Jul. 14, 2021

(65) Prior Publication Data

US 2022/0111851 A1     Apr. 14, 2022

(30) Foreign Application Priority Data

Oct. 12, 2020 (KR) .......................... 10-2020-0131435

(51) Int. Cl.
*B60W 40/08* (2012.01)
*G06F 3/01* (2006.01)
*B60W 50/16* (2020.01)
*B60W 60/00* (2020.01)
*B60W 50/14* (2020.01)

(52) U.S. Cl.
CPC ............ *B60W 40/08* (2013.01); *B60W 50/16* (2013.01); *B60W 60/0053* (2020.02); *B60W 60/0057* (2020.02); *G06F 3/015* (2013.01); *B60W 2040/0872* (2013.01); *B60W 2050/143* (2013.01); *B60W 2050/146* (2013.01); *B60W 2540/221* (2020.02); *B60W 2540/229* (2020.02)

(58) Field of Classification Search
CPC .. B60W 40/08; B60W 50/16; B60W 60/0053; B60W 60/0057; B60W 2040/0872; B60W 2050/143; B60W 2050/146; B60W 2540/221; B60W 2540/229; G06F 3/015
See application file for complete search history.

(56) References Cited

U.S. PATENT DOCUMENTS 10,235,117 B2 * 3/2019 Hoshihara .............. B60K 37/06
11,229,404 B2 * 1/2022 Rundo ............... A61B 5/02108
(Continued)

OTHER PUBLICATIONS

Jung, Sang-Joong et al., "Driver fatigue and drowsiness monitoring system with embedded electrocardiogram sensor on steering wheel," IET Intell. Transp. Syst, 2014, vol. 8, Iss. 1, pp. 43-50.

*Primary Examiner* — Mohamed Barakat
(74) *Attorney, Agent, or Firm* — McDonnell Boehnen Hulbert & Berghoff LLP

(57) ABSTRACT

An apparatus and a method for detecting an attention level of a driver are provided. The apparatus includes an electrocardiogram (ECG) sensor that measures ECG of a driver and a controller that calculates a standard deviation of NN interval (SDNN) quantifying an attention level of the driver using the ECG measured by the ECG sensor and detects the attention level of the driver based on the calculated SDNN.

14 Claims, 6 Drawing Sheets

(56) References Cited

U.S. PATENT DOCUMENTS

| | | | | |
|---|---|---|---|---|
| 2015/0158425 A1* | 6/2015 | Han | ............... | B60Q 9/00 |
| | | | | 340/439 |
| 2016/0196098 A1* | 7/2016 | Roth | ............... | G09G 5/00 |
| | | | | 715/761 |
| 2017/0177959 A1* | 6/2017 | Boos | ............... | G08B 21/06 |
| 2018/0297603 A1* | 10/2018 | Jun | ............... | A61B 5/18 |
| 2020/0330020 A1* | 10/2020 | Rundo | ............ | B60W 40/08 |

* cited by examiner

APPARATUS AND METHOD FOR DETECTING ATTENTION LEVEL OF DRIVER

CROSS REFERENCE TO RELATED APPLICATIONS

This application claims the benefit of priority to Korean Patent Application No. 10-2020-0131435, filed in the Korean Intellectual Property Office on Oct. 12, 2020, the entire contents of which are incorporated herein by reference.

TECHNICAL FIELD

The present disclosure relates to technologies of detecting a driving attention level using a biometric signal of a driver.

BACKGROUND

In general, the manner which detects the state of a driver analyzes an image of the driver and analyzes a reaction of the driver.

The manner which analyzes the image of the driver captures a face of the driver using a camera provided inside the vehicle, analyzes the captured image to obtain motion of eyelids, a change in size of the pupil, a change in gaze, a change in mouth shape (e.g., a yawn), or the like, and detects a state (e.g., drowsiness, fatigue, careless driving, or the like) of the driver based on the obtained information.

Such a manner which analyzes the image of the driver does not detect the state of the driver at high accuracy, when strong light is introduced from the outside or when the face of the driver departs from an image capture range of the camera.

The manner which analyzes the reaction of the driver detects a state of the driver based on behavior information of the vehicle, which is obtained by means of various sensors provided in the vehicle.

Such a manner which analyzes the reaction of the driver does not the state of the driver at high accuracy, when an error occurs in the sensor.

As a result, the existing manner which detects the state of the driver identifies the state of the driver based on information which is not directly associated with a biometric signal of the driver, it does not detect an attention level, which is close associated with a biometric signal of the driver, at high accuracy.

Details described in the background art are written to increase the understanding of the background of the present disclosure, which may include details rather than an existing technology well known to those skilled in the art.

SUMMARY

The present disclosure has been made to solve the above-mentioned problems occurring in the prior art while advantages achieved by the prior art are maintained intact.

An aspect of the present disclosure provides an apparatus and a method for detecting an attention level of a driver to obtain microcurrent (e.g., an action current according to cardiac contraction) which flows in the body of the driver by means of electrodes provided in the vehicle, filter the obtained microcurrent to measure electrocardiogram (ECG) (or photoplethysmography (PPG)) of the driver, calculate a standard deviation of NN interval (SDNN) which is an analysis index quantifying an attention level based on the measured ECG, and detect an attention level of the driver based on the calculated SDNN to detect the attention level of the driver at high accuracy.

The technical problems to be solved by the present disclosure concept are not limited to the aforementioned problems, and any other technical problems not mentioned herein will be clearly understood from the following description by those skilled in the art to which the present disclosure pertains. Furthermore, it may be easily seen that purposes and advantages of the present disclosure may be implemented by means indicated in claims and a combination thereof.

According to an aspect of the present disclosure, an apparatus for detecting an attention level of a driver may include an electrocardiogram (ECG) sensor that measures ECG of the driver and a controller that calculates a standard deviation of NN interval (SDNN) quantifying the attention level of the driver using the ECG measured by the ECG sensor and detects the attention level of the driver based on the calculated SDNN.

In an embodiment of the present disclosure, the controller may determine the attention level of the driver as being 'good', when the SDNN is greater than a first reference value, may determine the attention level of the driver as being 'bad', when the SDNN is less than or equal to a second reference value, and may determine the attention level of the driver as 'average', when the SDNN is less than or equal to the first reference value and is greater than the second reference value.

In an embodiment of the present disclosure, the apparatus may further include an output device that warns the driver using at least one of a visual alert, an audible alert, or a tactile alert depending on the attention level of the driver.

In an embodiment of the present disclosure, the controller may control the output device to change a color of text on a display, when the attention level of the driver is 'good', may control the output device to change a size and a color of text on the display, when the attention level of the driver is 'average', and may control the output device to change a color of the entire screen on the display and change a size and a color of text on the display, when the attention level of the driver is 'bad'.

In an embodiment of the present disclosure, the controller may control the output device to output a warning sound at minimum volume, when the attention level of the driver is 'good', may control the output device to output a warning sound at middle volume, when the attention level of the driver is 'average', and may control the output device to output a warning sound at maximum volume, when the attention level of the driver is 'bad'.

In an embodiment of the present disclosure, the controller may control the output device to output a warning sound at the longest period, when the attention level of the driver is 'good', may control the output device to output a warning sound at a middle period, when the attention level of the driver is 'average', and may control the output device to output a warning sound at the shortest period, when the attention level of the driver is 'bad'.

In an embodiment of the present disclosure, the controller may transmit information about the attention level of the driver to at least one of a highway driving assist (HDA) system, a lane keeping assist (LKA) system, or advanced driver assistance systems (ADAS) provided in a vehicle, such that the system which receives the information about the attention level of the driver adjusts a time to warn the driver.

In an embodiment of the present disclosure, the system which receives the information about the attention level of the driver may delay a default warning time, when the attention level of the driver is 'good', may warn the driver at the default warning time, when the attention level of the driver is 'average', and may shorten the default warning time, when the attention level of the driver is 'bad'.

In an embodiment of the present disclosure, the system which receives the information about the attention level of the driver may switch from an idle state to an operation state, when a state where the attention level of the driver is 'bad' continues during a reference time.

In an embodiment of the present disclosure, the controller may adjust a time when control authority of an autonomous vehicle is handed over to the driver and a manner which guides the driver to take over the control authority with regard to the attention level of the driver, when the apparatus is loaded into the autonomous vehicle.

According to another aspect of the present disclosure, a method for detecting an attention level of a driver may include measuring, by an ECG sensor, ECG of the driver, calculating, by a controller, a standard deviation of NN interval (SDNN) quantifying the attention level of the driver using the ECG, and detecting, by the controller, the attention level of the driver based on the calculated SDNN.

In an embodiment of the present disclosure, the detecting of the attention level of the driver may include determining the attention level of the driver as being 'good', when the SDNN is greater than a first reference value, determining the attention level of the driver as being 'bad', when the SDNN is less than or equal to a second reference value, and determining the attention level of the driver as 'average', when the SDNN is less than or equal to the first reference value and is greater than the second reference value.

In an embodiment of the present disclosure, the method may further include warning, by an output device, the driver using at least one of a visual alert, an audible alert, or a tactile alert depending on the attention level of the driver.

In an embodiment of the present disclosure, the warning the driver may include changing a color of text on a display, when the attention level of the driver is 'good', changing a size and a color of text on the display, when the attention level of the driver is 'average', and changing a color of the entire screen on the display and changing a size and a color of text on the display, when the attention level of the driver is 'bad'.

In an embodiment of the present disclosure, the warning the driver may include outputting a warning sound at minimum volume, when the attention level of the driver is 'good', outputting a warning sound at middle volume, when the attention level of the driver is 'average', and outputting a warning sound at maximum volume, when the attention level of the driver is 'bad'.

In an embodiment of the present disclosure, the warning the driver may include outputting a warning sound at the longest period, when the attention level of the driver is 'good', outputting a warning sound at a middle period, when the attention level of the driver is 'average', and outputting a warning sound at the shortest period, when the attention level of the driver is 'bad'.

In an embodiment of the present disclosure, the method may further include transmitting, by the controller, information about the attention level of the driver to at least one of a highway driving assist (HDA) system, a lane keeping assist (LKA) system, or advanced driver assistance systems (ADAS) provided in a vehicle and adjusting, by the system which receives the information about the attention level of the driver, a time to warning the driver.

In an embodiment of the present disclosure, the adjusting of the time to warn the driver may include delaying a default warning time, when the attention level of the driver is 'good', warning the driver at the default warning time, when the attention level of the driver is 'average', and shortening the default warning time, when the attention level of the driver is 'bad'.

In an embodiment of the present disclosure, the adjusting of the time to warn the driver may include switching, by the system which receives the information about the attention level of the driver, from an idle state to an operation state, when a state where the attention level of the driver is 'bad' continues during a reference time.

In an embodiment of the present disclosure, the method may further include adjusting, by the controller, a time when control authority of an autonomous vehicle is handed over to the driver and a manner which guides the driver to take over the control authority with regard to the attention level of the driver, when the method is applied to the autonomous vehicle.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
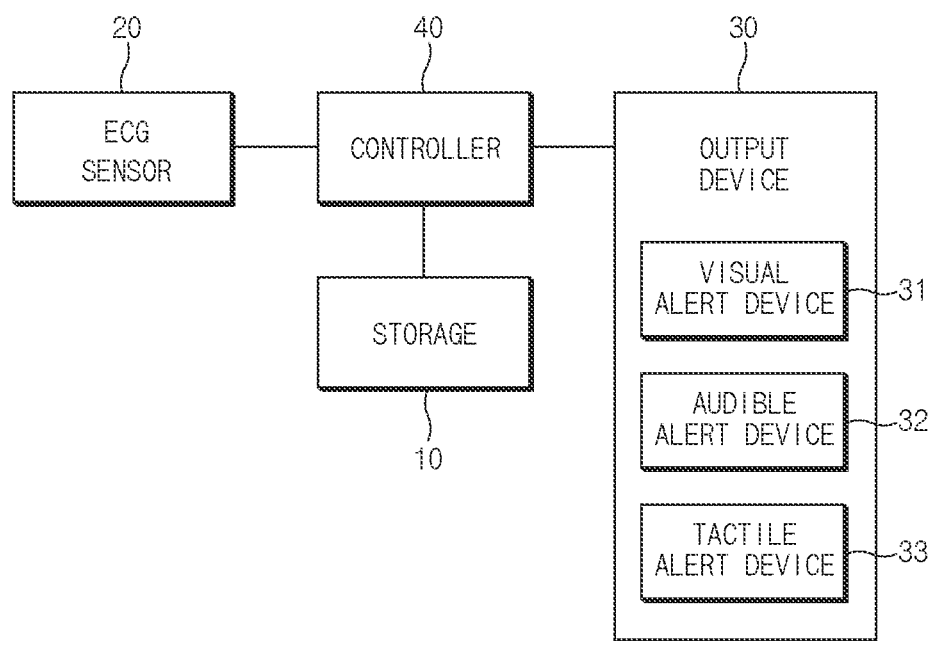
FIG. 1 is a block diagram illustrating a configuration of an apparatus for detecting an attention level of a driver according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for detecting an attention level of a driver according to an embodiment of the present disclosure.

As shown in FIG. 1, the apparatus for detecting the attention level of the driver according to an embodiment of the present disclosure may include a storage 10, an electrocardiogram (ECG) sensor 20, an output device 30, and a controller 40. In this case, the respective components may be combined into one component and some components may be omitted, depending on a manner which executes the apparatus for detecting the attention level of the driver according to an embodiment of the present disclosure.

Seeing the respective components, first of all, the storage 10 may store various logics, algorithms, and programs required in a process of obtaining microcurrent (e.g., an action current according to cardiac contraction) which flows in the body of a driver through electrodes provided in the vehicle, filtering the obtained microcurrent to measure electrocardiogram (ECG) (or photoplethysmography (PPG)) of the driver, calculating a standard deviation of NN interval (SDNN) which is an analysis index quantifying an attention level based on the measured ECG, and detecting an attention level of the driver based on the calculated SDNN.

The storage 10 may store a condition table storing conditions used to determine an attention level of the driver based on the SDNN. Such a condition table is shown in, for example, Table 1 below.

TABLE 1

| Condition | Attention Level |
|---|---|
| $SDNN_{Current} > SDNN_{Normal} \times 1.25$ | Good |
| $SDNN_{Normal} \times 1.25 \geq SDNN_{Current} > SDNN_{Normal} \times 0.75$ | Average |
| $SDNN_{Current} \leq SDNN_{Normal} \times 0.75$ | Bad |

In Table 1 above, it is preferable that $SDNN_{Normal}$ is, for example, 47, and weights (1.25, 0.75) may vary with the age, gender, or weight of the driver. Herein, that the attention level of the driver is 'good' means that a change width of a pulse interval is greater than a first threshold on the ECG of the driver, and the attention level of the driver is 'bad' means that the change width of the pulse interval is less than or equal to a second threshold on the ECG of the driver. The SDNN graph used to derive Table 1 above is shown in FIG. 2.

Figure 2:
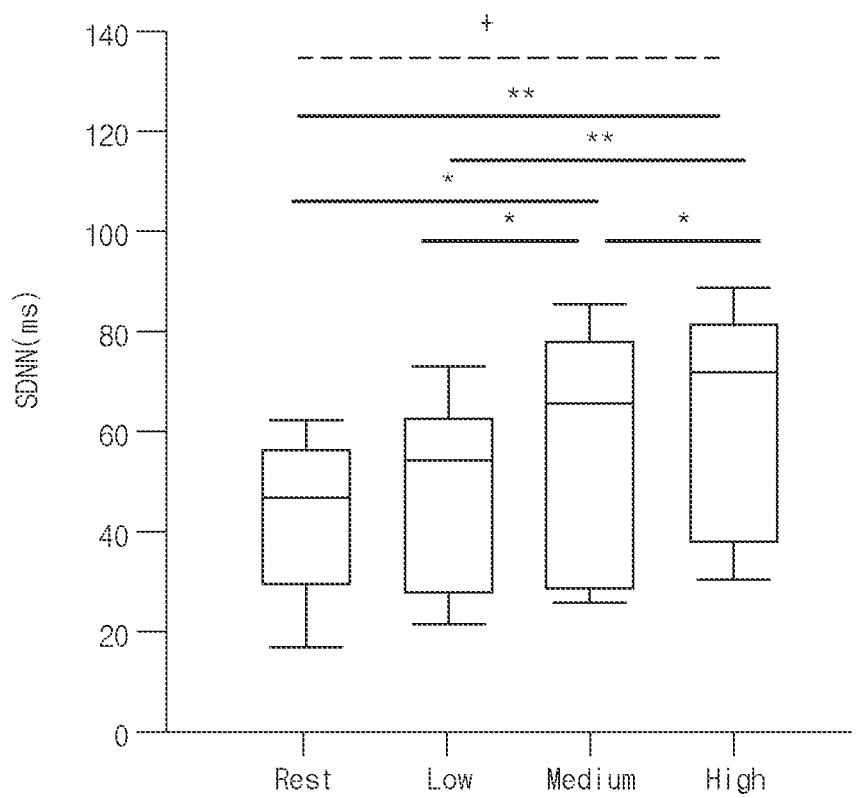
FIG. 2 is a drawing illustrating an SDNN graph used to generate a condition table stored in a storage of an apparatus for detecting an attention level of a driver according to an embodiment of the present disclosure.

FIG. 2 is a drawing illustrating an SDNN graph used to generate a condition table stored in a storage of an apparatus for detecting an attention level of a driver according to an embodiment of the present disclosure.

As shown in FIG. 2, the vertical axis indicates the SDNN and the horizontal axis indicates the attention level of the driver. In the horizontal axis, 'Rest' indicates the idle state when the driver stops the vehicle, which indicates that it is unable to calculate the attention level, low' indicates that the attention level of the driver is low during driving, 'Medium' indicates that the attention level of the driver is middle during driving, and 'High' indicates that the attention level of the driver is high during driving.

The storage 10 may store a volume table in which volume information corresponding to the attention level of the driver is recorded. Such a volume table is shown in, for example, Table 2 below.

TABLE 2

| Attention Level | Volume Level |
|---|---|
| Good | 3 |
| Average | 5 |
| Bad | 8 |

In Table 2, as the volume level is higher, higher volume is indicated. The storage 10 may store a period table in which a warning sound output period corresponding to the attention level of the driver is recorded. Such a period table is shown in, for example, Table 3 below.

TABLE 3

| Attention Level | Number of times warning sound is output (one second) |
|---|---|
| Good | One Time |
| Average | Three Times |
| Bad | Five Times |

In Table 3 above, the number of times the warning sound is output refers to the number of warning sounds output for one second. For example, when the attention level of the driver is 'bad', the warning sound may be output five times for one second.

The storage 10 may store an event table in which a warning event corresponding to the attention level of the driver is recorded. Such an event table is shown in, for example, Table 4 below.

TABLE 4

| Attention Level | Event |
|---|---|
| Good | Change color of text on display |
| Average | Change size and color of text on display |
| Bad | Change color of entire screen on display |
| | Change size and color of text on display |

In Table 4 above, the change in text size, the change in text color, and a change in entire screen color refer to changing to a different size and a different color based on a size of a default text, a color of the default text, and a color of a default entire screen. Furthermore, when the attention level of the driver is 'bad', the change in entire screen color on the display may include turning on/off a red warning screen.

A storage 10 of FIG. 1 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

Figure 3:
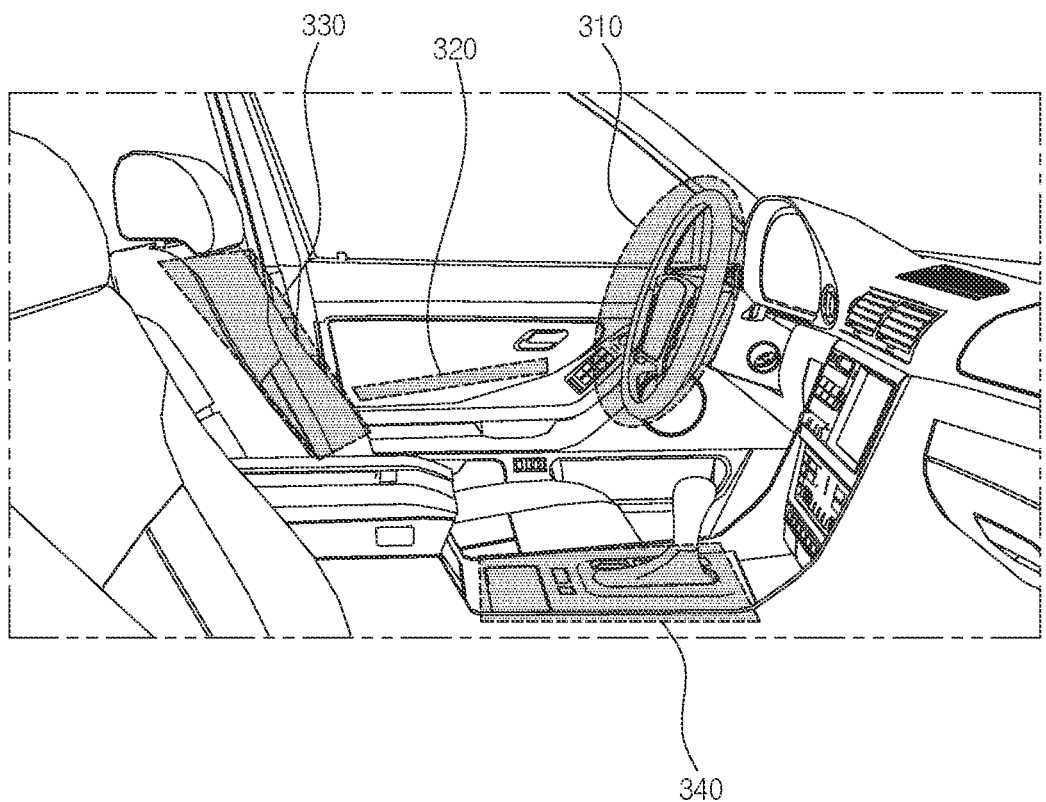
FIG. 3 is a drawing illustrating a location of an electrode of an electrocardiogram (ECG) sensor provided in an apparatus for detecting an attention level of a driver according to an embodiment of the present disclosure.

An ECG sensor 20 of FIG. 1 may obtain microcurrent (e.g., an action current according to cardiac contraction), which flows in the body of the driver through electrodes provided in the vehicle and may filter the obtained microcurrent to measure ECG of the driver. As shown in FIG. 3, such an ECG sensor 20 may include an electrode inside the vehicle.

FIG. 3 is a drawing illustrating a location of an electrode of an ECG sensor provided in an apparatus for detecting an attention level of a driver according to an embodiment of the present disclosure.

As shown in FIG. 3, an electrode of an ECG sensor 20 provided in the apparatus for detecting the attention level of the driver according to an embodiment of the present disclosure may be mounted on at least one of a steering wheel 310, a door trim 320, a seat 330, or a center console 340.

Such an ECG sensor 20 may include a filter for removing a noise signal from an ECG signal.

As another embodiment, the ECG sensor 20 may be replaced to a photoplethysmography (PPG) sensor (not shown).

An output device 30 of FIG. 1 may warn a driver using at least one of a visual alert, an audible alert, or a tactile alert depending on the attention level of the driver. Such an output device 30 may include a visual alert device 31, an audible alert device 32, and a tactile alert device 33 to warn the driver of a risk.

The visual alert device 31 may include a head up display (HUD), a liquid crystal display (LCD)-type cluster, or the like, which may perform an operation corresponding to Table 4 above under control of a controller 40 of FIG. 1.

The audible alert device 32 may output a warning sound as an audible warning and may perform an operation corresponding to Tables 2 and 3 above under control of the controller 40. In this case, the warning sound may include a simple buzzer sound and a voice warning. For example, the voice warning may include 'Focus on driving for safety', 'The family is waiting', or the like.

The tactile alert device 33 may generate vibration as a tactile warning on the steering wheel 310, the seat 330, or the like under control of the controller 40.

The controller 40 may perform the overall control such that respective components may normally perform their own functions. Such a controller 40 may be implemented in the form of hardware, may be implemented in the form of software, or may be implemented in the form of a combination thereof. Preferably, the controller 40 may be implemented as, but not limited to, a microprocessor.

The controller 40 may detect an attention level of the driver, corresponding to the ECG measured by the ECG sensor 20, based on the condition table stored in the storage 10.

The controller 40 may calculate a standard deviation of NN interval (SDNN) which is an analysis index quantifying the attention level based on the ECG measured by the ECG sensor 20 and may detect an attention level of the driver based on the calculated SDNN. In this case, when the SDNN is greater than a first reference value (e.g., 59), the controller 40 may determine the attention level of the driver as being 'good'. When the SDNN is less than or equal to a second reference value (e.g., 35), the controller 40 may determine the attention level of the driver as being 'bad'. When the SDNN is less than or equal to the first reference value and is greater than the second reference value, the controller 40 may determine the attention level of the driver as 'average'.

Meanwhile, the controller 40 may interwork with a highway driving assist (HDA) system, a lane keeping assist (LKA) system, advanced driver assistance systems (ADAS), or the like provided in the vehicle network over the vehicle network. In this case, the vehicle network may include a controller area network (CAN), a controller area network with flexible data-rate (CAN FD), a local interconnect network (LIN), FlexRay, media oriented systems transport (MOST), an Ethernet, or the like.

For example, the controller 40 may transmit information about the attention level of the driver to the HDA system, the LKA system, the ADAS, or the like, such that each system adjusts a time and a time point to warn the driver.

For example, when a time when the driver does not hold the steering wheel is greater than a reference time and when the ADAS outputs a warning screen and a warning sound to warn the driver, the ADAS may output them for one hour (a default time−15 seconds), when the attention of the driver is 'good', may output them for second hours (the default time+15 seconds), when the attention level of the driver is 'bad', and may output them during the default time, when the attention level of the driver is 'average'.

As another example, when the time when the driver does not hold the steering wheel is greater than the reference time and when the ADAS outputs a warning screen and a warning sound to warn the driver, the ADAS may output them at intervals of a first time (the default time+15 seconds), when the attention of the driver is 'good', may output them at intervals of a second time (the default time−15 seconds), when the attention level of the driver is 'bad', and may output them at intervals of the default time, when the attention level of the driver is 'average'. Herein, the screen warning the driver is shown in FIG. 4.

Figure 4:
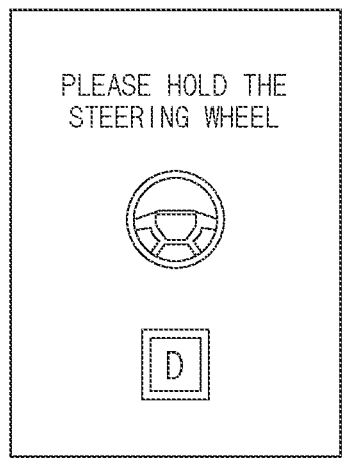
FIG. 4 is a drawing illustrating a warning screen output by an output device provided in an apparatus for detecting an attention level of a driver according to an embodiment of the present disclosure.

FIG. 4 is a drawing illustrating a warning screen output by an output device provided in an apparatus for detecting an attention level of a driver according to an embodiment of the present disclosure.

As shown in FIG. 4, a visual alert device 31 of FIG. 1 may display a screen guiding a driver to hold the steering wheel (handle) on a cluster.

When the state where the attention level of the driver is 'bad' continues above 30 seconds, the ADAS may switch from an idle state to an operation state (an active state) for itself.

When the state where the attention level of the driver is 'bad' continues above 30 seconds, the HDA system may switch from an idle state to an operation state for itself.

When the state where the attention level of the driver is 'bad' continues above 30 seconds, the LKA system may switch from an idle state to an operation state for itself.

Meanwhile, when an embodiment of the present disclosure is applied to a fully autonomous vehicle or a partially autonomous vehicle, the controller 40 may adjust a time when control authority of the autonomous vehicle is handed over to the driver, may adjust a type of control authority handed over to the driver, or may adjust a manner which guides the driver to take over control authority, with regard to an attention level of the driver.

For example, the controller 40 may adjust control authority transition of the autonomous vehicle based on Table 5 below.

TABLE 5

| Attention Level | Guide to control authority transition | Time to hand over control authority |
|---|---|---|
| Good | Guidance volume 3 Default guidance screen Guidance duration 15 seconds | After 15 seconds |

TABLE 5-continued

| Attention Level | Guide to control authority transition | Time to hand over control authority |
|---|---|---|
| Average | Guidance volume 5 Caution guidance screen Guidance duration 30 seconds | After 30 seconds |
| Bad | Guidance volume 8 Warning guidance screen Guidance duration Extend 10 seconds at a time after 45 seconds | Extend 10 seconds at a time after 45 seconds |

Figure 5:
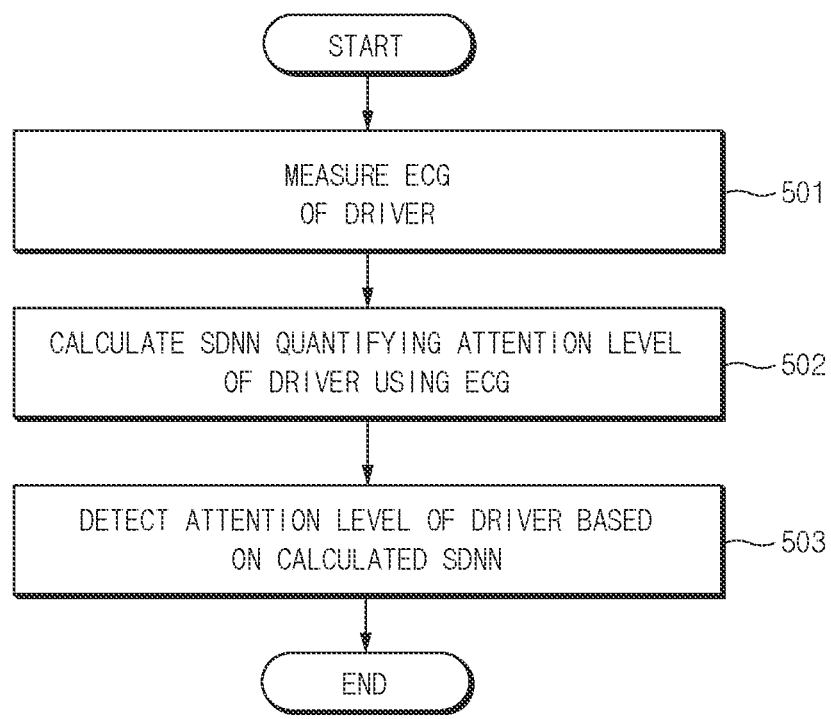
FIG. 5 is a flowchart illustrating a method for detecting an attention level of a driver according to an embodiment of the present disclosure.

FIG. 5 is a flowchart illustrating a method for detecting an attention level of a driver according to an embodiment of the present disclosure.

First of all, in operation 501, an ECG sensor 20 of FIG. 1 may measure ECG of a driver.

In operation 502, a controller 40 of FIG. 1 may calculate a standard deviation of NN interval (SDNN) quantifying the attention level of the driver using the ECG.

In operation 503, the controller 40 may detect an attention level of the driver based on the calculated SDNN.

Figure 6:
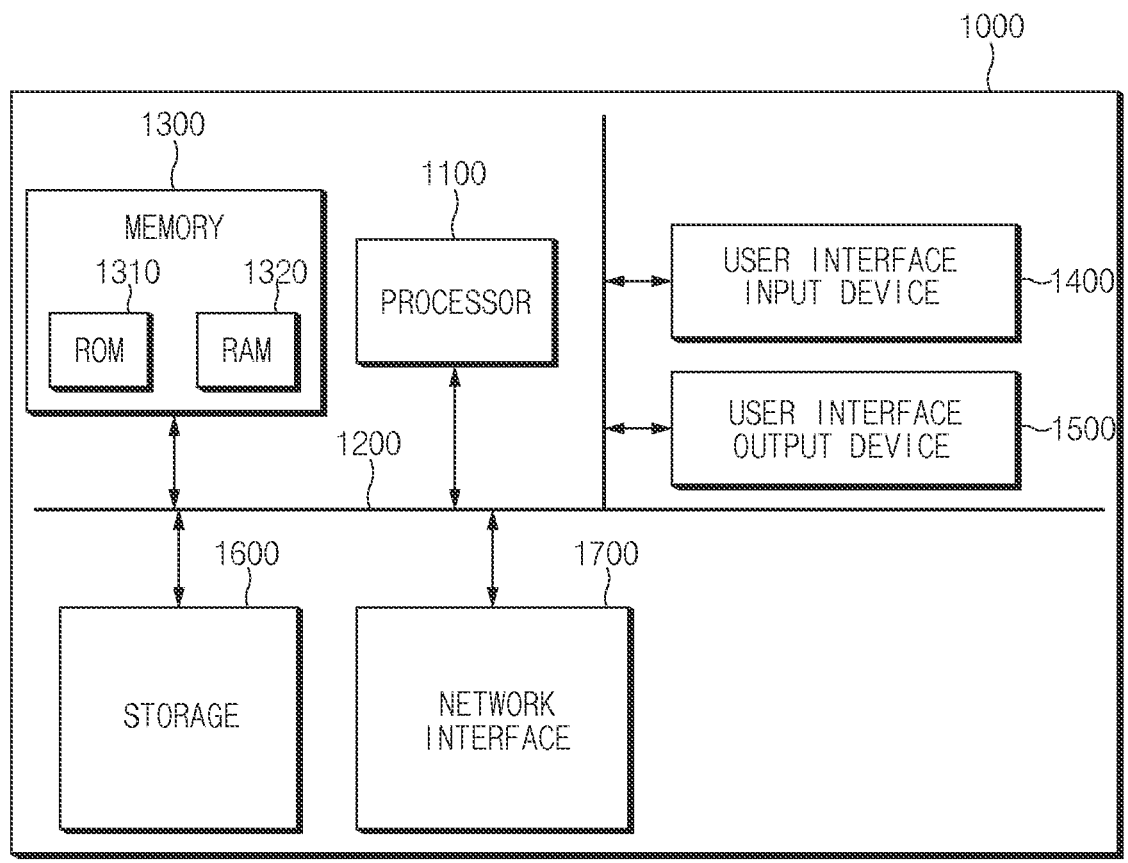
FIG. 6 is a block diagram illustrating a computing system for executing a method for detecting an attention level of a driver according to an embodiment of the present disclosure.

FIG. 6 is a block diagram illustrating a computing system for executing a method for detecting an attention level of a driver according to an embodiment of the present disclosure.

Referring to FIG. 6, the above-mentioned method for detecting the attention level of the driver according to an embodiment of the present disclosure may be implemented by means of the computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a SSD (Solid State Drive), a removable disk, and a CD-ROM. The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The apparatus and method for detecting the attention level of the driver according to an embodiment of the present disclosure may be provided to obtain microcurrent (e.g., an action current according to cardiac contraction) which flows in the body of the driver by means of electrodes provided in the vehicle, filter the obtained microcurrent to measure electrocardiogram (ECG) (or photoplethysmography (PPG)) of the driver, calculate a standard deviation of NN interval (SDNN) which is an analysis index quantifying an attention level based on the measured ECG, and detect an attention level of the driver based on the calculated SDNN.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

The invention claimed is:

1. An apparatus for detecting an attention level of a driver, the apparatus comprising:
    an electrocardiogram (ECG) sensor configured to measure ECG of the driver;
    a controller configured to calculate a standard deviation of NN interval (SDNN) quantifying the attention level of the driver using the ECG measured by the ECG sensor, and to detect the attention level of the driver based on the calculated SDNN; and
    an output device configured to warn the driver using at least one of a visual alert, an audible alert, or a tactile alert based on the attention level of the driver;
    wherein the controller determines the attention level of the driver as being 'good', when the SDNN is greater than a first reference value, determines the attention level of the driver as being 'bad', when the SDNN is less than or equal to a second reference value, and determines the attention level of the driver as 'average', when the SDNN is less than or equal to the first reference value and is greater than the second reference value;
    wherein the controller further controls the output device to change a color of text on a display when the attention level of the driver is 'good', controls the output device to change a size and a color of text on the display when the attention level of the driver is 'average', and controls the output device to change a color of the entire screen on the display and change a size and a color of text on the display when the attention level of the driver is 'bad'.

2. The apparatus of claim 1, wherein the controller controls the output device to output a warning sound at a minimum volume when the attention level of the driver is 'good', controls the output device to output a warning sound at a middle volume when the attention level of the driver is 'average', and controls the output device to output a warning sound at a maximum volume when the attention level of the driver is 'bad'.

3. The apparatus of claim 1, wherein the controller controls the output device to output a warning sound at a longest period when the attention level of the driver is 'good', controls the output device to output a warning sound at a middle period when the attention level of the driver is 'average', and controls the output device to output a warning sound at a shortest period when the attention level of the driver is 'bad'.

4. The apparatus of claim 1, wherein the controller transmits information about the attention level of the driver to at least one of a highway driving assist (HDA) system, a lane keeping assist (LKA) system, or advanced driver assistance systems (ADAS) provided in a vehicle, such that the system which receives the information about the attention level of the driver adjusts a time to warn the driver.

5. The apparatus of claim 4, wherein the system which receives the information about the attention level of the driver delays a default warning time when the attention level of the driver is 'good', warns the driver at the default warning time when the attention level of the driver is 'average', and shortens the default warning time when the attention level of the driver is 'bad'.

6. The apparatus of claim 4, wherein the system which receives the information about the attention level of the driver switches from an idle state to an operation state when a state where the attention level of the driver is 'bad' continues during a reference time.

7. The apparatus of claim 1, wherein the controller adjusts a time when control authority of an autonomous vehicle is handed over to the driver and a manner, which guides the driver to take over the control authority with regard to the attention level of the driver when the apparatus is loaded into the autonomous vehicle.

8. A method for detecting an attention level of a driver, the method comprising:
   measuring, by an ECG sensor, an ECG of the driver;
   calculating, by a controller, a standard deviation of NN interval (SDNN) quantifying the attention level of the driver using the ECG;
   detecting, by the controller, the attention level of the driver based on the calculated SDNN; and
   wherein the detecting of the attention level of the driver includes: determining the attention level of the driver as being 'good' when the SDNN is greater than a first reference value; determining the attention level of the driver as being 'bad' when the SDNN is less than or equal to a second reference value; and determining the attention level of the driver as 'average' when the SDNN is less than or equal to the first reference value and is greater than the second reference value;
   warning, by an output device, the driver using at least one of a visual alert, an audible alert, or a tactile alert based on the attention level of the driver;
   wherein the warning the driver includes: changing a color of text on a display when the attention level of the driver is 'good'; changing a size and a color of text on the display when the attention level of the driver is 'average'; and changing a color of the entire screen on the display and changing a size and a color of text on the display when the attention level of the driver is 'bad'.

9. The method of claim 8, wherein the warning the driver includes: outputting a warning sound at a minimum volume when the attention level of the driver is 'good', outputting a warning sound at a middle volume when the attention level of the driver is 'average', and outputting a warning sound at a maximum volume when the attention level of the driver is 'bad'.

10. The method of claim 8, wherein the warning the driver includes: outputting a warning sound at a longest period when the attention level of the driver is 'good', outputting a warning sound at a middle period when the attention level of the driver is 'average', and outputting a warning sound at a shortest period when the attention level of the driver is 'bad'.

11. The method of claim 8, further comprising: transmitting, by the controller, information about the attention level of the driver to at least one of a highway driving assist (HDA) system, a lane keeping assist (LKA) system, or advanced driver assistance systems (ADAS) provided in a vehicle; and adjusting, by the system which receives the information about the attention level of the driver, a time to warn the driver.

12. The method of claim 11, wherein the adjusting of the time to warn the driver includes:
   delaying a default warning time when the attention level of the driver is 'good';
   warning the driver at the default warning time when the attention level of the driver is 'average'; and
   shortening the default warning time when the attention level of the driver is 'bad'.

13. The method of claim 11, wherein the adjusting of the time to warn the driver includes:
   switching, by the system which receives the information about the attention level of the driver, from an idle state to an operation state, when a state where the attention level of the driver is 'bad' continues during a reference time.

14. The method of claim 8, further comprising:
   adjusting, by the controller, a time when control authority of an autonomous vehicle is handed over to the driver, and a manner which guides the driver to take over the control authority with regard to the attention level of the driver, when the method is applied to the autonomous vehicle.

* * * * *